J. A. Scott,
Camera Attachment,
No. 85,247.  Patented Dec. 22, 1868.
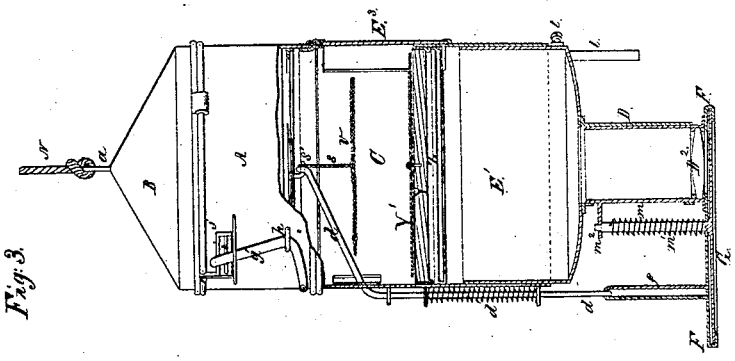
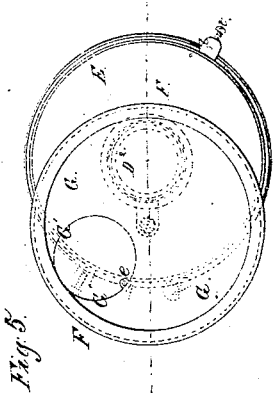
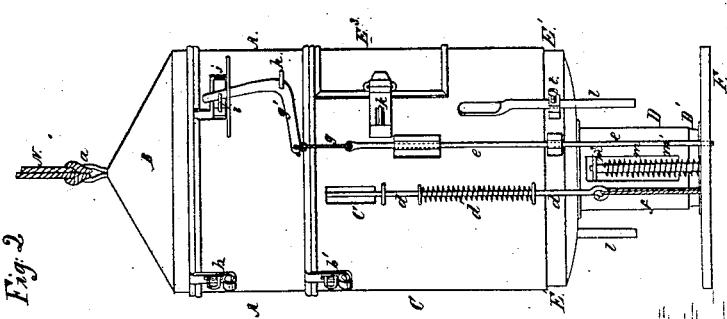
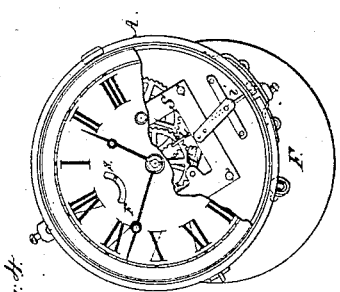
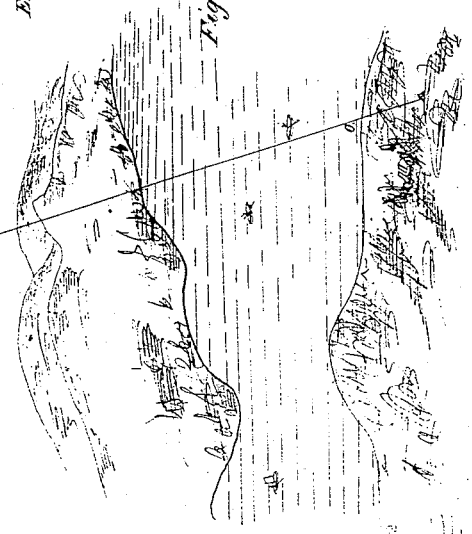
Witnesses:
R. T. Campbell
H. Campbell
Inventor:
John A. Scott
by
Senwick & Lawrence

UNITED STATES PATENT OFFICE.

JOHN A. SCOTT, OF LEXINGTON, VIRGINIA.

Letters Patent No. 85,247, dated December 22, 1868.

IMPROVEMENT IN PHOTOGRAPHIC CAMERAS.

The Schedule referred to in these Letters Patent and making part of the same.

*To all whom it may concern:*

Be it known that I, JOHN A. SCOTT, of Lexington, in the county of Rockbridge, and State of Virginia, have invented a new and useful Improvement in Photographing; and I do hereby declare that the following is a full, clear, and exact description thereof, reference being had to the accompanying drawings, making a part of this specification, in which—

Figure 1 is a view representing a photographic instrument attached to a balloon, and elevated above the surface of the earth, for taking a picture of the objects beneath.

Figures 2, 3, 4, and 5 are views showing the construction of an instrument which is adapted for taking pictures of the surface of the earth from elevated points.

Similar letters of reference indicate corresponding parts in the several figures.

This invention is designed to provide a safe and convenient means by which photographic pictures can be taken of cities, towns, roads, rivers, lines of sea-coast, and other objects upon the surface of the earth.

It consists mainly in the employment of balloons, of proper capacity, and controlled, in their ascent, by ropes from below, as a means for elevating photographic instruments considerable heights above the surface of the earth; and in providing instruments, which are to be so elevated, with means for automatically exposing the image-plates, and covering them again, at the proper times, so as not to require persons to ascend with the instruments, as will be hereinafter explained.

The invention further consists in providing a photographic camera, which is adapted for being elevated considerable heights above the earth's surface, and taking pictures thereof, with means whereby the magnetic meridian of the place represented by the picture taken will be indicated at the instant the image-plate is exposed to the light, as will be hereinafter explained.

To enable others skilled in the art to understand my invention, I will describe one practical mode of carrying it into effect.

The balloon which I employ may be made in any well-known manner, and of a capacity which will afford an ascensive power sufficient to carry up and sustain steadily one or more instruments which are adapted for taking pictures of objects upon the surface of the earth.

Fig. 1 of the drawings represents a balloon, P, having a photographic instrument suspended from its netting, P', by a rope, N.

This balloon is controlled by means of a rope, O, which may be attached to a portable windlass or reel, or which may be held in the hands of the photographer.

The object of the rope O is to arrest the balloon when it has attained the required height, and to draw down the balloon when a picture has been taken. This rope may also be used for another purpose, which will be hereinafter explained.

The body of the instrument for taking the pictures may be made of a cylindrical form, of any suitable capacity. It may be made of wood or metal, or partly of wood and metal.

I prefer to construct those parts of the instrument which will admit of it, of metal, for the purpose of securing the required degree of strength, combined with lightness and durability.

Said cylinder contains within its upper part, A, an ordinary spring-and-lever clock, which will give the time of day, and which will also serve as a means for automatically exposing the image-plate to the light, and again covering the lens-tube, as will be hereinafter explained.

Below the clock-work is a chamber, C, which is provided with a semicircular opening, closed by a door, E³, to which latter a circular case is affixed, which may be removed from its chamber by opening this door.

The top, Y, of this case is suitably marked off into degrees, representing a compass, and provided with a magnetic needle, Y', thus forming a magnetic compass.

The lower portion of this case is adapted to serve, in a suitable manner, for receiving the sensitized plate or image-plate Z, upon which the picture is to be produced.

Surrounding the image-plate Z may be a ring, having degrees marked upon it, corresponding to and arranged opposite the degrees marked upon the compass above it.

Above the needle Y' is a circular wire netting, V, which is suspended from a hook, S', by means of a cord or rod, S, which netting is dropped upon the compass-plate Y at the instant the sensitized plate is exposed to the light, thus arresting the needle Y' in the position it held when the picture was taken, and indicating the magnetic meridian of the place represented by the picture.

Beneath the compass and image-plate is a chamber, E¹, and the lens-tubes D, which latter are of less diameter than the body of the instrument, and which contain one or more lenses, D², adapted for taking instantaneous pictures.

The proper focal distances may be obtained by having the cylinder, to which the lens or lenses are applied, slide within the cylindrical body of the instrument, as shown in figs. 2 and 3, and using guide-rods $l$ and set-screws $t$ for securing the lenses at the required positions.

To the lower end of the lens-tubes a disk, F, is eccentrically secured, in a plane at right angles to the axis of these tubes; and to the bottom side of this disk a circular plate, G, is applied, so that it will rotate freely about its axis.

Through this plate G is an opening, G', which may be made of a size equal to the diameter of the opening through the disk F opposite the lens D²; or, if desirable, the opening G' may be made somewhat larger than said opening through the disk.

To the axis of the plate G a rod, $m$, is secured, which passes up through the disk F, and is guided by an arm, $m^2$, projecting from the lens-tubes; and around this rod a spring, $m^1$, is coiled, so that, in the act of turning the plate G about its axis, their spring will be wound up.

There are two small openings made through the disk F, one of which is designed for receiving through it the lower end of a rod, $e$, and the other, which is made with a short tongue, is designed for receiving a loop, $f$, which is attached to a rod, $d$.

The rod $e$ is allowed to receive a vertical movement, and is attached to one arm of a bent lever, $g'$, which is pivoted, at $h$, near the top of the instrument, the other arm of which lever is extended upward, opposite an oblong opening, $j$, through the body of the instrument, so as to be acted upon by a lever, $i$, at the proper time for taking a picture.

The lever $i$ is pivoted to the frame S of the clock-work, and its inner end engages with the minute-wheel T, as shown in fig. 4, so that, by the movement of this wheel, the lower arm of bent lever $g'$ will be raised, and the end of rod $e$ drawn out of the hole through the disk F.

The rod $d$ passes through eyes formed upon the external surface of the body of the instrument, and is bent, so as to enter the chamber C through an opening, $c$, and extend up to the hook S', at which point an eye is formed upon rod $d$, through which the hook S' passes, as shown in fig. 3.

A spring, $d'$, is applied to the straight external portion of the rod $d$, for the purpose of drawing this rod upward when the lower end of its loop is released from the hooked eye made through the disk F.

To operate with this instrument, the plate G is turned round, and the end of rod $e$ inserted through the disk F far enough to arrest this plate, with the end of the lens-tube covered by it. The loop $f$ of rod $d$ is also drawn down, and attached to the tongue-piece in a hole made through the said disk F. The wire netting V is then hung, by its loop S, upon the hook S', the sensitized plate is introduced into its place, and the lens or lenses, as the case may be, adjusted to obtain the proper focus. The instrument thus adjusted and prepared is attached to a balloon by the rope N, and, when everything is ready for its ascent, the lever $i$ is set so that the minute-hand of the clock will, at a certain time, operate upon levers $i$ $g$, and release the plate G.

The balloon, with the instrument attached, is allowed to ascend until it attains the proper elevation, when it is held by the rope O until the picture is taken.

When the plate G is released, as above set forth, the spring $m^1$ will cause it to move around, expose the image-plate, and cover the end of the lens-tube again. At the same time, a suitable projection on the upper side of plate G will detach the loop $f$ from its hook, and allow the spring $d'$ and rod $d$ to detach the netting V from its suspension-hook S', thereby causing this netting to fall upon and hold the needle Y' in the position which it assumed when the picture was taken.

I do not confine my invention to the precise construction and form of the parts herein described, for they may be changed and modified, as may be found desirable.

Instead of employing clock-work for automatically exposing and closing the lens-tube at the proper time for taking a picture, I can effect the same object by applying one or more electro-magnets to the instrument, communicating with a battery upon the surface of the earth by means of insulated wires running through or around the rope O, by which the balloon is held, said magnet or magnets being applied so as to operate upon one or more armatures applied to the lever $g'$, or to any equivalent device which will release an exposing and covering-device applied to the lenses.

By means of the magnets and battery-connections above described, the operator, stationed upon the earth, can, at pleasure, cause the picture to be taken by the instrument when it is suspended in mid-air.

In order that the time when the picture is taken may be ascertained by the photographer, a ball, flag, or other object may be attached to the instrument in such manner that such object will be dropped to the earth at the instant the image-plate is uncovered.

It will be seen, from the above description, that I am enabled to produce pictures of portions of the surface of the earth from considerable heights, without requiring a person to ascend with the instruments, and, at the same time, to reveal the points of the compass of the pictures taken.

Under certain conditions of the air, and with an attainable lightness in the instrument, I would use a kite of sufficient power to take up the instrument.

It will be seen also that, by combining a sufficient number of the above-described photographic instruments, and arranging them on a light circular frame, with their disk-covered lenses outward, and their tops confined together by a ring, and by that ring sliding up and down, at pleasure, on a central rod or cylinder, marked off into degrees, as a quadrant, and all operated at once by the clock or electro-magnet, I can take, in the several instruments, the whole circle of the horizon, and at any angle of inclination I may choose.

The tubes which contain the lenses of the instrument are to be capable of sliding, the one within the other, so as to adjust the lenses, as in an ordinary telescope, to the distance of objects sought to be photographed.

Having described my invention,

What I claim as new, and desire to secure by Letters Patent, is—

1. The method, substantially as herein described, of producing pictures from considerable heights above the earth's surface, consisting in the employment of a balloon, or other analogous elevating-apparatus, which has suspended from it a photographic instrument, provided with devices for exposing and closing the image-plate, and which is controlled by means substantially as described.

2. The combination of a magnetic compass with an instrument which is adapted for producing photographic pictures from considerable heights above the surface of the earth, substantially as described.

3. The netting V, or its equivalent, applied over the compass-needle Y', so as to operate substantially as and for the purposes described.

4. Providing the photographic instrument with a contrivance which will automatically, or at the will of the operator, expose the image-plate, substantially as described.

May 20, 1868.

JNO. A. SCOTT.

Witnesses:
L. W. PAXTON,
S. C. O. TERRALL.